United States Patent [19]

McGuiness et al.

[11] Patent Number: 5,433,165

[45] Date of Patent: Jul. 18, 1995

[54] METHOD OF MANUFACTURING A BOAT HULL

[75] Inventors: Daniel T. McGuiness, Toronto; Pierre P. Dubois, Penitanguishene, both of Canada

[73] Assignee: Outboard Marine Corporation, Waukegan, Ill.

[21] Appl. No.: 220,110

[22] Filed: Mar. 30, 1994

[51] Int. Cl.$^6$ ............................................. B63B 5/24
[52] U.S. Cl. .................................. 114/357; 264/225; 264/510; 264/571
[58] Field of Search ................ 114/357; 264/225, 257, 264/275, 277, DIG. 72, 510, 571

[56] References Cited

U.S. PATENT DOCUMENTS

| | | | |
|---|---|---|---|
| 2,495,640 | 1/1950 | Muskat | 154/110 |
| 2,541,297 | 2/1951 | Sampson et al. | 18/59 |
| 2,617,126 | 11/1952 | Nebesar | 114/357 |
| 2,903,389 | 9/1959 | Fujita | 154/110 |
| 2,913,036 | 11/1959 | Smith | 154/1.6 |
| 2,993,822 | 7/1961 | Reeves | 154/110 |
| 3,028,284 | 4/1962 | Reeves | 156/213 |
| 3,137,750 | 6/1964 | Gringras | 264/257 |
| 3,192,297 | 6/1965 | Gringras | 264/257 |
| 3,309,450 | 3/1967 | Rodgers | 264/257 |
| 3,368,293 | 2/1968 | Wiltshire | 18/5 |
| 3,410,936 | 11/1968 | Juras | 264/90 |
| 3,442,998 | 5/1969 | Wiltshire | 264/120 |
| 3,479,666 | 11/1969 | Webb | 2/3 |
| 3,675,294 | 7/1972 | Palfreyman et al. | 23/156.8 R |
| 3,711,581 | 1/1973 | Fowler, Jr. et al. | 264/45 |
| 3,761,560 | 9/1973 | Newlove | 264/257 |
| 3,773,581 | 11/1973 | Stanley | 156/71 |
| 3,934,064 | 1/1976 | Lowthian | 428/36 |
| 3,940,524 | 2/1976 | Hoppe et al. | 428/86 |
| 3,954,931 | 5/1976 | Helmuth et al. | 264/90 |
| 3,961,014 | 6/1976 | Pasch et al. | 264/297 |
| 3,962,394 | 6/1976 | Hall | 264/90 |
| 4,044,188 | 8/1977 | Segal | 428/283 |
| 4,062,917 | 12/1977 | Hill et al. | 264/102 |
| 4,069,290 | 1/1978 | Pasch | 264/297 |
| 4,088,525 | 5/1978 | Gowetski et al. | 156/173 |
| 4,098,856 | 7/1978 | Rosenau | 264/225 X |
| 4,099,280 | 7/1978 | Hoppe et al. | 114/357 |
| 4,120,632 | 10/1978 | Stoeberl | 425/405 R |
| 4,123,488 | 10/1978 | Lawson | 264/135 |
| 4,207,282 | 7/1980 | Grisch | 264/257 |
| 4,229,497 | 10/1980 | Piazza | 428/71 |
| 4,234,633 | 11/1980 | Gowetski et al. | 428/36 |
| 4,312,829 | 1/1982 | Fourcher | 264/571 |
| 4,353,964 | 10/1982 | Grimm et al. | 428/408 |
| 4,636,422 | 1/1987 | Harris et al. | 428/174 |
| 4,693,678 | 9/1987 | VonVolkli | 425/405 |
| 4,755,341 | 7/1988 | Reavely et al. | 264/313 |
| 4,762,740 | 8/1988 | Johnson et al. | 428/68 |
| 4,780,262 | 10/1988 | VonVolkli | 264/512 |
| 4,786,347 | 11/1988 | Angus | 156/172 |
| 4,824,631 | 4/1989 | Yeager | 264/552 |
| 4,902,215 | 2/1990 | Seemann, III | 425/406 |
| 4,910,067 | 3/1990 | O'Neill | 428/139 |
| 4,940,558 | 7/1990 | Jarboe et al. | 264/225 X |
| 5,035,602 | 7/1991 | Johnson | 425/468 |
| 5,036,789 | 8/1991 | Kelly et al. | 114/357 |
| 5,045,251 | 9/1991 | Johnson | 264/40.1 |
| 5,052,906 | 10/1991 | Seemann | 425/112 |

(List continued on next page.)

*Primary Examiner*—Sherman Basinger
*Attorney, Agent, or Firm*—Michael, Best & Friedrich

[57] ABSTRACT

A method for manufacturing a boat hull having an outer surface and including fiber-reinforced polymer and a plurality of stringers embedded in the fiber-reinforced polymer so that the fiber-reinforced polymer and the stringers define an inner surface of the boat hull, the method comprising the steps of providing a female mold with a periphery and an inner surface having the shape of the hull outer surface, placing dry reinforcement material on the mold inner surface, placing stringers on the dry reinforcement material, the stringers having additional dry reinforcement material thereon, providing a male mold with a periphery and an inner surface having the shape of the hull inner surface, placing the male mold over the stringers and the dry reinforcement material to define a space between the male mold and the female mold, sealing the peripheries of the male mold and the female mold, drawing a vacuum in the space between the male mold and the female mold, injecting resin into the space, and curing the resin.

15 Claims, 5 Drawing Sheets

U.S. PATENT DOCUMENTS

| | | | |
|---|---|---|---|
| 5,059,377 | 10/1991 | Ashton et al. | 264/257 |
| 5,071,338 | 12/1991 | Dublinski et al. | 425/403 |
| 5,087,193 | 2/1992 | Herbert, Jr. | 425/543 |
| 5,106,568 | 4/1992 | Honka | 264/510 |
| 5,126,091 | 6/1992 | Melton | 264/510 |
| 5,131,834 | 7/1992 | Potter | 425/389 |
| 5,151,277 | 9/1992 | Bernardon et al. | 425/112 |
| 5,152,949 | 10/1992 | Leoni et al. | 264/257 |
| 5,183,619 | 2/1993 | Tolton | 264/257 |
| 5,204,033 | 4/1993 | Pearce et al. | 264/136 |
| 5,204,042 | 4/1993 | James et al. | 264/257 |
| 5,217,669 | 6/1993 | Dublinski et al. | 264/258 |
| 5,266,249 | 11/1993 | Grimes, III et al. | 264/45.2 |
| 5,286,438 | 2/1994 | Dublinski et al. | 264/220 |

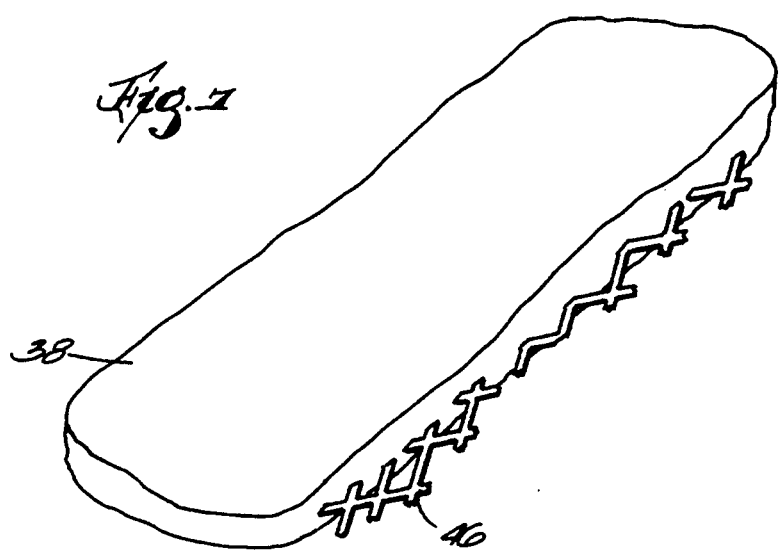

METHOD OF MANUFACTURING A BOAT HULL

BACKGROUND OF THE INVENTION

The invention relates to the manufacturing of boat hulls, and more particularly to the manufacturing of fiber-reinforced polymer or fiber-reinforced plastic boat hulls.

The spray-up technique, lay-up technique, or a combination of the two is the most common method of manufacturing fiber-reinforced polymer (FRP) boat hulls. In both techniques, a mold release agent (wax) is applied to an open, single-sided, female mold, and then a layer of gelcoat, which becomes the outer surface of the hull, is sprayed onto the mold. Typical gelcoat thicknesses are from 0.4 mm to 0.8 mm. After the gelcoat has hardened, a layer ("skincoat") of chopped glass fiber and polyester resin with catalyst is sprayed onto the gelcoat with a thickness of approximately 2 mm. The skincoat is allowed to cure before the remaining layers (the bulk laminate) of the hull are applied. The purpose of the skincoat is to protect the gelcoat from the high temperatures which may result from the exothermic reaction of the resin in the bulk layer as the resin cures. The lay-up technique involves placing glass mat or other reinforcing materials in the mold and saturating the reinforcement material with a mixture of liquid polymer resin and catalyst. In the spray-up technique, chopped glass fibers, liquid resin and the catalyst are sprayed into the mold. In both methods, air and excess resin are manually forced out of the reinforcing material using hand-held rollers. Layers are added and allowed to cure as needed to build the hull to the desired thickness. Finally, wooden stringers are placed in the hull in the mold and additional layers are added over the stringers to secure the stringers to the FRP shell.

The resin most commonly used is polyester. Polyester resins used in boat building may contain styrene monomer in varying amounts. The styrene monomer reduces the viscosity of the liquid polyester resin, improving its flowability, and the styrene also cross-links with the polyester as the resin cures, resulting in a strong final product. Disadvantageously, styrene monomer is quite volatile and is an air pollutant. The spray-up and lay-up techniques result in significant styrene emissions.

It is also known to manufacture a boat hull without stringers by resin transfer molding. See, for example, U.S. Pat. No. 4,902,215. In resin transfer molding (RTM), dry reinforcement material is placed in a molding cavity defined by one or more mold surfaces, and liquid resin is then injected into the cavity to form the FRP product. See U.S. Pat. No. 4,762,740, which is incorporated herein by reference, for further explanation of conventional resin transfer molding. In one type of resin transfer molding, one of the mold halves is a flexible bag or sheet known as a vacuum bag.

SUMMARY OF THE INVENTION

The invention provides an improved method for manufacturing an FRP boat hull. This method requires less labor and less material (particularly resin), is faster, and results in less pollution than conventional spray-up or lay-up techniques. This method also provides a stronger hull than is provided by known RTM techniques for manufacturing boat hulls. The invention also provides an improved method for making a vacuum bag for manufacturing a boat hull in an RTM process.

Specifically, the method of the invention is for manufacturing a boat hull including fiber-reinforced polymer and a plurality of stringers embedded in the polymer. First, a female mold is manufactured. The mold has a peripheral flange and an inner surface having the shape of the outer surface of the hull to be manufactured. Next, the mold inner surface is coated with a release agent, a gelcoat and a skincoat if desired. After the gelcoat and skincoat are cured, dry reinforcement material, such as various types of strand mat or woven roving, is placed in the mold. Stringers, with additional dry reinforcement material (preferably glass mat) thereon, are placed on the dry reinforcement material and a vacuum bag is placed over the stringers and the reinforcement material. In order to prevent resin from pooling beneath the stringers, a material such as Coremat is placed between the stringers and the dry reinforcement material.

The vacuum bag has a peripheral flange which is sealed to the peripheral flange of the mold so as to provide a manifold or plenum in which a vacuum can be drawn around the entire perimeter of the mold cavity or space between the mold and the vacuum bag. The plenum is preferably formed by providing inner and outer endless seals at the peripheral flanges. Bleeder cloth can be placed between the vacuum bag and the mold and extending from the mold cavity into the plenum. The bleeder cloth prevents the vacuum bag from sealing against the perimeter of the mold and assures that the entire mold cavity communicates with the plenum. A vacuum is then drawn in the mold cavity by evacuating the plenum, and catalyzed resin is injected into the mold cavity through ports in the vacuum bag. The ports are closed off at all times, except when resin is being injected, to maintain a vacuum in the mold cavity. The vacuum is maintained until the resin has cured.

The mold used in this process is preferably identical to a mold that would be used in the conventional spray-up or lay-up process except that the peripheral flange is significantly wider in order to permit formation of the plenum.

The vacuum bag is reusable with a minimum of maintenance. The bag is preferably made of reinforced clear silicone rubber. The bag is fabricated to conform to the shape of the inner surface of the boat hull including the stringers and any other components that may be molded into the hull, such as fuel tank mounting plates or a nose block. It is important that the bag be flexible and elastic. It must also be compatible with the resin used in the molding process (in both the liquid and solid states), and the bag must not adhere to the cured resin if it is to be reusable. The bag is preferably made with silicone RTV caulking material. This facilitates repairing the bag because silicone bonds very well to silicone. A stretchable reinforcing material, such as polyester fishnet fabric, is preferably embedded in the silicone to increase tear resistance.

To make the bag, a complete hull including stringers and any other components is built in the mold. The hull can be made by the conventional spray-up or lay-up processes. The inner surface of the hull is finished to make it relatively smooth and free of sharp edges. The bag is made by spreading layers of the caulking material on the inside of the hull while the hull is still in the mold. To aid in spreading the silicone, a solvent such as naphtha, toluene or methylene hydrate is used to thin the silicone until a "paintable" consistency is achieved. Several layers of the silicone mixture are "painted" onto the inner surface of the hull, with time allowed between coats to let the silicone cure. The layer of reinforcing material is then laid over the silicone, and several more layers of silicone mixture are applied. The clear silicone and fishnet fabric result in a relatively transparent bag that allows resin flow to be observed during the RTM process. Injection ports are either added after the foregoing or molded in with the bag. Any suitable method can be used to form the injection ports.

Other features and advantages of the invention will become apparent to those skilled in the art upon review of the following detailed description, claims and drawings.

DESCRIPTION OF THE DRAWINGS

FIG. 7 is a partial perspective view of the vacuum bag.

Figure 1:
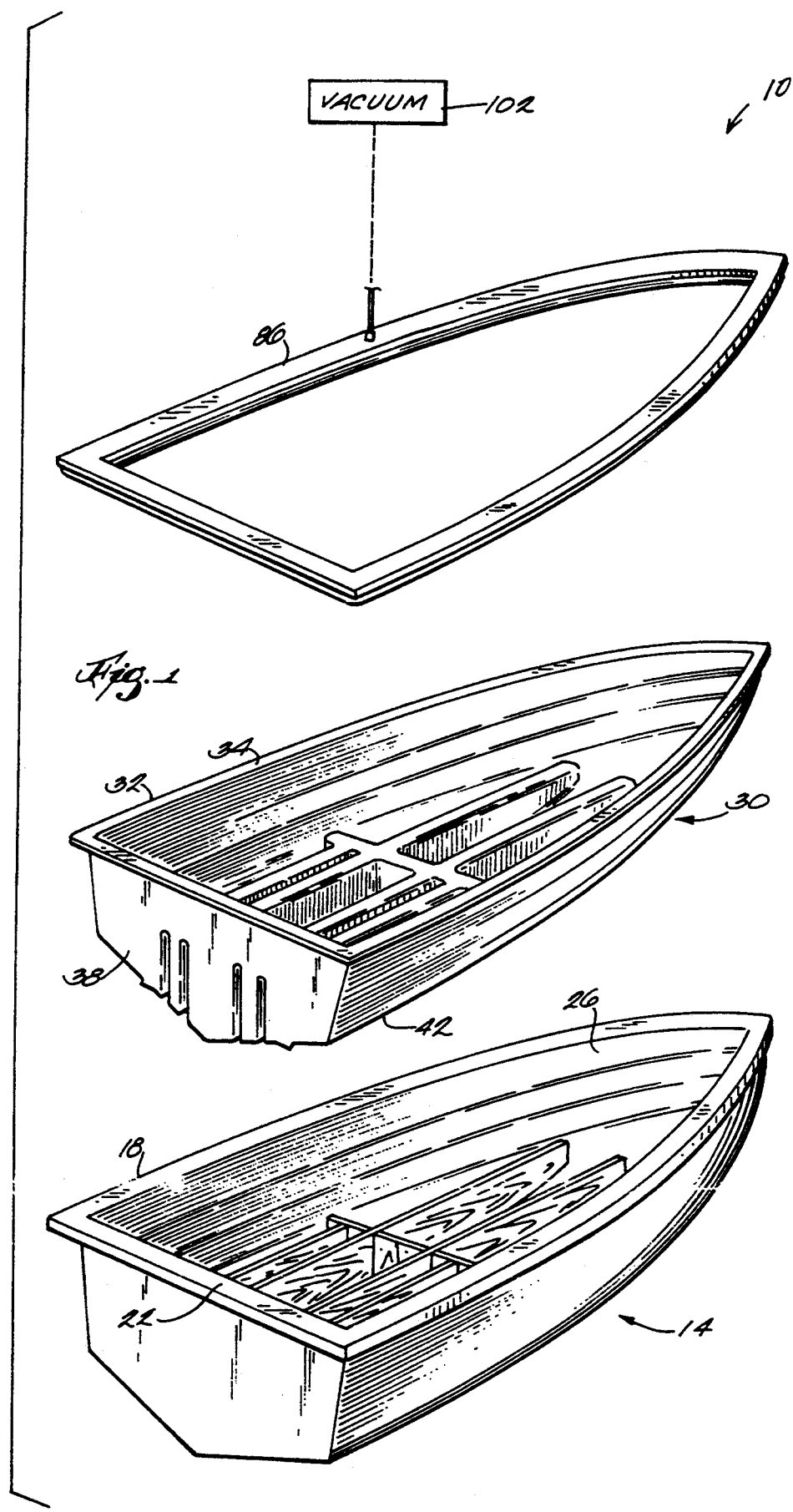
FIG. 1 is an exploded perspective view of apparatus used in performing the method of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Apparatus 10 for performing the method of the invention is illustrated in the drawings. The apparatus 10 includes (see FIG. 1) a female mold 14 having a periphery 18 and peripheral flange 22. The mold 14 is the same as would be used in a conventional spray-up or lay-up process except that, whereas the flange around the perimeter of a conventional mold is typically 50 or 75 mm wide, the peripheral flange 22 of the mold 14 is approximately 125 to 150 mm wide. The mold 14 has an inner surface 26, having the shape of the outer surface of the hull to be manufactured.

Figure 5:
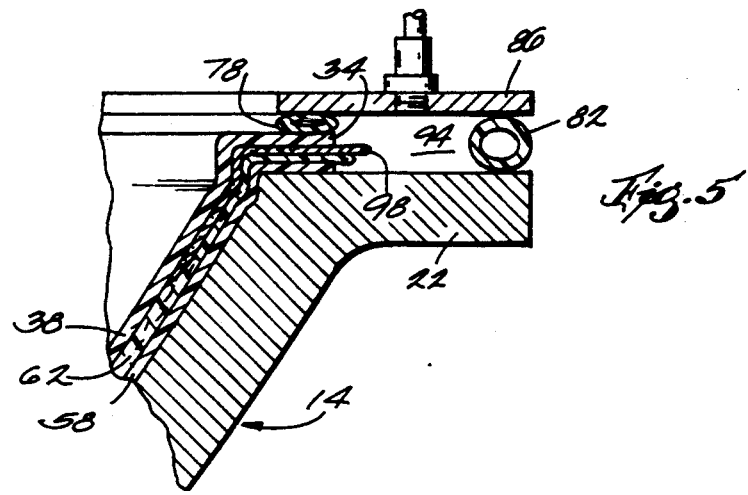
FIG. 5 is a view taken along line 5—5 in FIG. 4.

The apparatus 10 also includes a male mold 30 having a periphery 32 and a peripheral flange 34. The male mold 30 is preferably a flexible vacuum bag 38 made of silicone rubber in a manner described below. The bag 38 is partially illustrated in FIG. 7. As shown in FIG. 5, the peripheral flange 34 of the vacuum bag 38 is preferably less than half as wide as the flange 22 of the mold 14. The vacuum bag 38 has an inner surface 42 (the lower surface in FIG. 1) having the shape of the inner surface of the hull to manufactured.

The bag 38 is preferably made with clear silicone RTV caulking material. A suitable silicone is available from General Electric Corporation and is sold as RTV 700 with a beta 2 cure and 910 diluent. To make the bag 38, a complete hull (not shown) including stringers and any other components is built in the mold 14. The conventional spray-up or lay-up processes can be used to manufacture the hull used in making the bag 38. The inner surface of this hull should be finished to make it relatively smooth. The silicone caulking material is thinned to a paintable consistency with a solvent such as naphtha, toluene or methylene hydrate. Roughly three parts naphtha to two parts silicone has been found to be a good mixture. Several coats (approximately eight) of the silicone mixture are painted onto the inner surface of the hull, with the silicone being allowed to cure between coats. Next, a layer of reinforcing material, such as stretchable polyester fishnet fabric 46 (FIG. 7), is laid over the silicone, and then several more layers of silicone mixture are applied. The resultant reinforced silicone bag 38 (partially shown in FIG. 7) is relatively transparent. Injection ports 50 (see FIG. 3) can be either molded into the bag 38 while the bag is being formed or added to the bag 38 later. In theory, a single injection port 50 in the center of the bag 38 is adequate. In practice, however, it may be desirable to have several injection ports 50 at various locations. The optimum number and location of injection ports 50 depends on the size and shape of the hull being manufactured and can be determined easily through experimentation.

Figure 6:
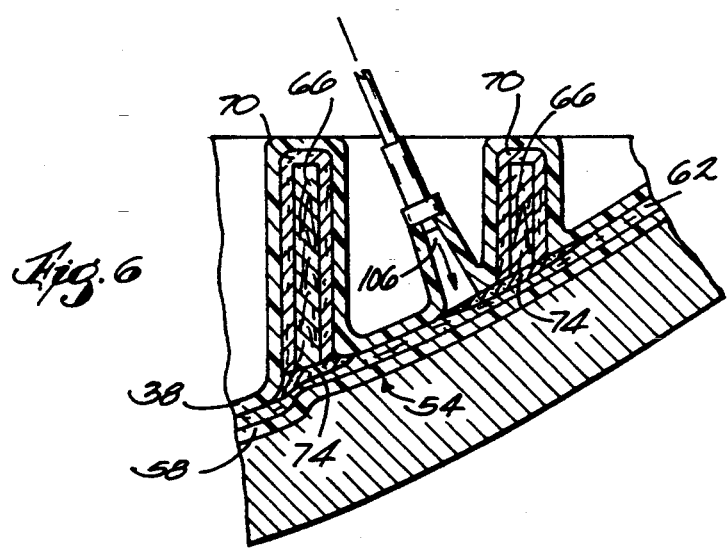
FIG. 6 is an enlarged portion of FIG. 3

To manufacture a boat hull in accordance with the invention, the mold inner surface 26 is coated with (see FIG. 6) a release agent 54, a gelcoat 58 and a skincoat (if desired). The release agent 54 should be applied as needed. Next, dry reinforcement material 62 is placed in the mold 14. The dry reinforcement material 62 can be various types of strand mat, woven roving, or a combination of these. Any other suitable dry reinforcement material can be employed. Next, structural members, such as wooden stringers 66 (see FIGS. 3 and 6), are placed on top of the dry reinforcement material 62. The stringers 66 are surrounded by additional dry reinforcement material 70, preferably glass mat. To prevent resin from pooling beneath the stringers 66 (to prevent excessive shrinkage and resultant print-through), and as shown in FIG. 6, approximately three layers of a material 74 such as Coremat, which is available from E. F. Walters Company of Montreal or Coremat U.S.A., are placed between the stringers 66 and the dry reinforcement material 62 in the mold 14. The Coremat 74 can be fixed to the underside of the stringers 66 before the stringers 66 are placed in the mold 14. The Coremat 74 prevents resin pooling because the Coremat does not absorb a significant amount of resin.

The vacuum bag 38 is then placed in the mold 14 over the stringers 66 and the dry reinforcement material 62, with the peripheral flange 34 of the vacuum bag 38 partially overlapping the peripheral flange 22 of the mold 14. A mold space or cavity containing the dry reinforcement material 62 and the stringers 66 is defined between the vacuum bag 38 and the mold 14.

Figure 2:
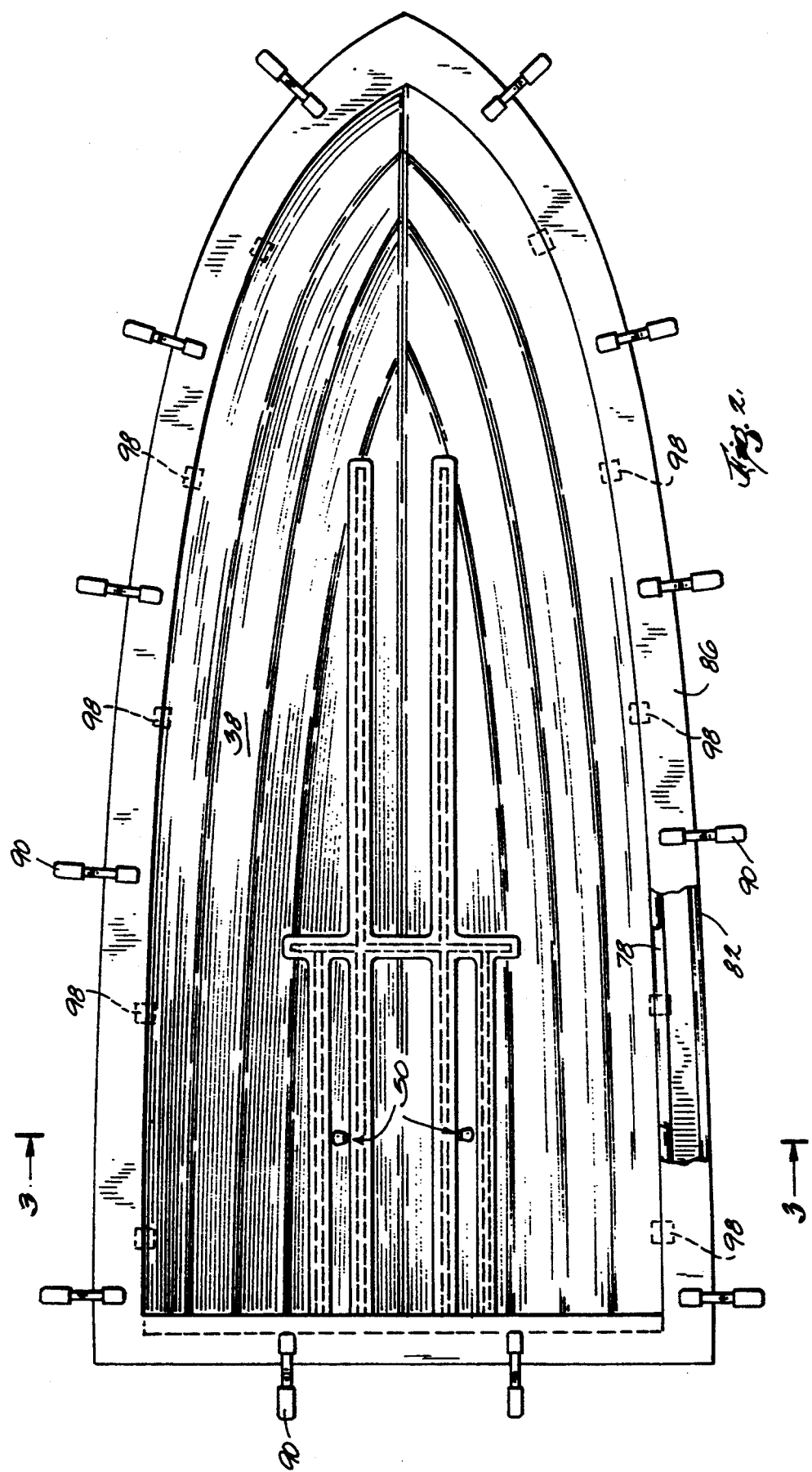
FIG. 2 is a top plan view of the apparatus shown in FIG. 1.
Figure 3:
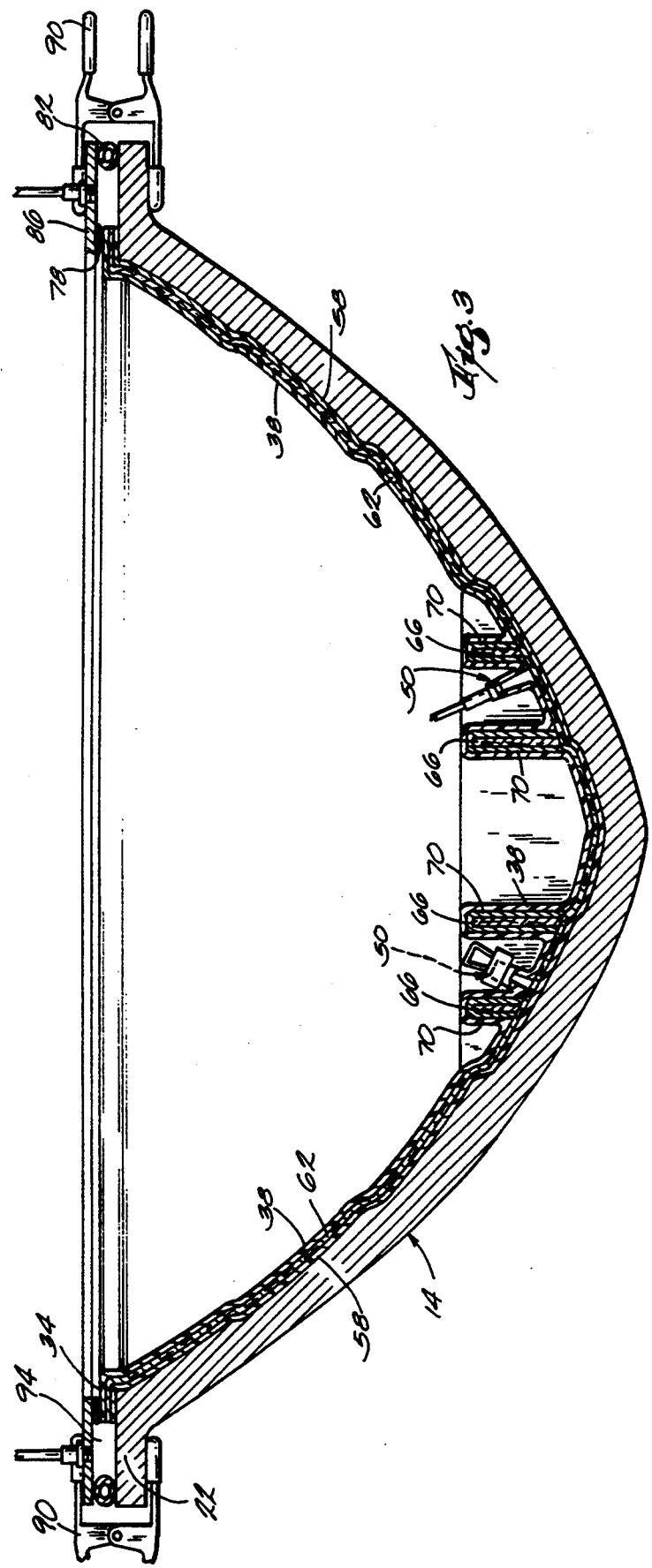
FIG. 3 is a view taken along line 3—3 in FIG. 2.
Figure 4:
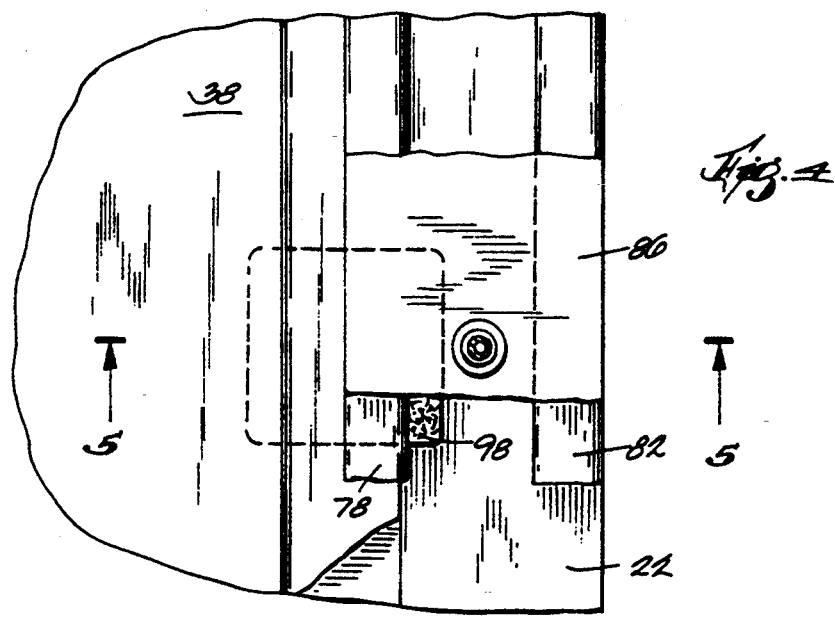
FIG. 4 is an enlarged portion of FIG. 2.

As shown in FIGS. 3 and 5, the peripheries of the vacuum bag 38 and the mold 14 are sealed by inner and outer endless seals 78 and 82 and a sealing member or plate 86 having the shape of the mold flange 22. The outer seal 82 is located between the upper surface of the mold flange 22 and the underside of the sealing member 86, and the inner seal 78 is located between the upper surface of the vacuum bag flange 34 and the underside of the sealing member 86. The sealing member 86 is clamped to the mold flange 22 by clamps 90 so that the seals 78 and 82 are compressed to define an airtight plenum or manifold 94 between the seals 78 and 82 and between the sealing member 86 and the mold flange 22. As shown in FIGS. 2, 4 and 6, strips of bleeder cloth 98

(preferably Coremat) spaced around the periphery of the vacuum bag 38 overlap the dry reinforcement material 62 and communicate with the plenum 94 to facilitate air flow from the mold space to the plenum 94. The plenum 94 communicates with a vacuum pump 102 which creates a vacuum in the plenum 94 and thus in the mold space. A conventional three-quarters horsepower combined electric motor/vacuum pump capable of twenty-six to twenty-eight inches Hg has been used. The vacuum pump 102 (see FIG. 1) must be able to establish and maintain a vacuum under the vacuum bag 38. The purpose of the vacuum is to remove air from the dry reinforcement material 62, to hold the dry reinforcement material 62 in place during resin injection and resin cure, and to enhance movement of the injected resin throughout the mold space. The strips of bleeder cloth 98 around the bag periphery create a uniform vacuum throughout the mold space.

After a vacuum has been drawn in the mold space, resin (identified by reference numeral 106 in FIG. 6) is injected into the injection ports 50, through one port at a time. Any suitable resin, such as an unsaturated polyester resin, can be employed. Unused ports 50 are clamped off. Because of the reduced pressure in the mold space, the resin does not have to be injected under significant pressure. An injection pressure of up to twenty-eight inches Hg is sufficient. If the injection ports 50 are properly located, resin will completely fill the mold space, saturating the dry reinforcement material 62. If necessary, hand-held rollers can be rolled over the vacuum bag 38 to promote resin flow throughout the mold space. Finally, the resin is allowed to cure, and then the bag 38 is removed. The vacuum is maintained until the resin has cured.

As mentioned above, this method requires less labor and less material (particularly resin), is faster, and results in less pollution (lower styrene emissions) than conventional spray-up or lay-up techniques.

Various features of the invention are set forth in the following claims.

We claim:

1. A method for manufacturing a boat hull having an outer surface and including fiber-reinforced polymer and a plurality of stringers embedded in the fiber-reinforced polymer so that the fiber-reinforced polymer and the stringers define an inner surface of the boat hull, said method comprising the steps of
   providing a female mold with a periphery and an inner surface having the shape of the hull outer surface,
   placing dry reinforcement material on said mold inner surface,
   placing stringers on said dry reinforcement material, said stringers having additional dry reinforcement material thereon,
   providing a male mold with a periphery and an inner surface having the shape of the hull inner surface,
   placing said male mold over said stringers and said dry reinforcement material to define a space between said male mold and said female mold,
   sealing said peripheries of said male mold and said female mold,
   reducing the pressure in said space between said male mold and said female mold,
   injecting resin into said space, and
   curing said resin.

2. A method as set forth in claim 1 wherein said male mold providing step includes providing a vacuum bag.

3. A method as set forth in claim 2 wherein said female mold has a peripheral flange, wherein said vacuum bag has a peripheral flange, wherein said sealing step includes the step of forming a plenum between said peripheral flanges, and wherein said pressure reducing step includes the step of reducing the pressure in said plenum.

4. A method as set forth in claim 2 wherein said vacuum bag providing step includes the steps of forming in said female mold a hull having a relatively smooth inner surface, and spreading a plurality of layers of liquid silicone rubber on said hull inner surface.

5. A method as set forth in claim 4 wherein said spreading step includes the steps of providing silicone caulking material, and adding a solvent to said caulking material to make said caulking material spreadable.

6. A method as set forth in claim 4 wherein said spreading step includes the step of allowing said silicone rubber to cure between layers.

7. A method as set forth in claim 6 and further comprising the step of providing a layer of reinforcing material between two layers of said silicone rubber.

8. A method for manufacturing a boat hull having an outer surface and including fiber-reinforced polymer and plurality of stringers embedded in the fiber-reinforced polymer so that the fiber-reinforced polymer and the stringers define an inner surface of the boat hull, said method comprising the steps of
   providing a female mold with a periphery, a peripheral flange, and an inner surface having the shape of the hull outer surface,
   placing dry reinforcement material on said mold inner surface,
   placing stringers on said dry reinforcement material, said stringers having additional dry reinforcement material thereof,
   providing a male mold including a vacuum bag with a periphery, a peripheral flange, and an inner surface having the shape of the hull inner surface,
   placing said male mold over said stringers and said dry reinforcement material to define a space between said male mold and said female mold,
   sealing said peripheries of said male mold and said female mold by forming a plenum between said peripheral flanges, said plenum forming step including the step of providing inner and outer endless seals at said peripheral flanges such that said plenum is defined between said seals,
   reducing the pressure in said space between said male mold and said female mold by reducing the pressure in said plenum,
   injecting resin into said space, and
   curing said resin.

9. A method as set forth in claim 8 and further comprising the step of providing a bleeder cloth between said vacuum bag and said mold and beneath said inner seal to facilitate air flow from said space to said plenum.

10. A method for manufacturing a boat hull having an outer surface and including fiber-reinforced polymer and a plurality of stringers embedded in the fiber-reinforced polymer so that the fiber-reinforced polymer and the stringers define an inner surface of the boat hull, said method comprising the steps of
   providing a female mold with a periphery and an inner surface having the shape of the hull outer surface,
   placing dry reinforcement material on said mold inner surface, placing stringers on said dry reinforcement material, said stringers having additional dry reinforcement material thereon, placing bleeder cloth between said stringers and said dry reinforcement material, providing a male mold with a periphery and an inner surface having the shape of the hull inner surface, placing said male mold over said stringers and said dry reinforcement material to define a space between said male mold and said female mold, sealing said peripheries of said male mold and said female mold, reducing the pressure in said space between said male mold and said female mold, injecting resin into said space, and curing said resin.

11. A method as set forth in claim 10 wherein said bleeder cloth placing step includes the step of attaching said bleeder cloth to said stringers prior to placing said stringers on said dry reinforcement material.

12. A method as set forth in claim 1 and further comprising the steps of coating said mold inner surface with a release agent and a gelcoat, and wherein said dry reinforcement material is placed on said gelcoat.

13. A method for manufacturing a boat hull having an outer surface and including fiber-reinforced polymer and a plurality of stringers embedded in the fiber-reinforced polymer so that the fiber-reinforced polymer and the stringers define an inner surface of the boat hull, said method comprising the steps of providing a female mold with a periphery, a peripheral flange, and an inner surface having the shape of the hull outer surface, coating said mold inner surface with a release agent and a gelcoat, placing dry reinforcement material on said gelcoat, placing stringers on said dry reinforcement material, said stringers having additional dry reinforcement material thereon, placing bleeder cloth between said stringers and said dry reinforcement material, providing a vacuum bag with a periphery, a peripheral flange, and an inner surface having the shape of the hull inner surface, said bag being provided by forming in said mold a hull having a relatively smooth inner surface, spreading a plurality of layers of liquid silicone rubber on said hull inner surface, providing a layer of reinforcing material between two layers of said silicone rubber, and allowing said silicone rubber to cure between layers, placing said vacuum bag over said stringers and said dry reinforcement material to define a space between said vacuum bag and said mold, sealing said peripheries of said vacuum bag and said mold by providing inner and outer endless seals at said peripheral flanges such that a plenum is defined between said seals, providing a bleeder cloth between said vacuum bag and said mold and beneath said inner seal to facilitate air flow from said space to said plenum, reducing the pressure in said space between said vacuum bag and said mold by reducing the pressure in said plenum, injecting resin into said space, and curing said resin.

14. A method as set forth in claim 13 wherein said spreading step includes the steps of providing silicone caulking material, and adding a solvent to said caulking material to make said caulking material spreadable.

15. A method as set forth in claim 13 wherein said bleeder cloth placing step includes the step of attaching said bleeder cloth to said stringers prior to placing said stringers on said dry reinforcement material.

* * * * *